(12) United States Patent
Kondo

(10) Patent No.: US 6,625,606 B1
(45) Date of Patent: Sep. 23, 2003

(54) SYSTEM AND METHOD FOR FILING/SEARCHING DATA HAVING A FULL-TEXT FUNCTION AND MEDIA FOR RECORDING THE METHOD

(75) Inventor: Nobuaki Kondo, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/461,283

(22) Filed: Dec. 15, 1999

(30) Foreign Application Priority Data

Dec. 15, 1998 (JP) .......................... 10-356016

(51) Int. Cl.[7] .............................. G06F 17/30
(52) U.S. Cl. ................... 707/100; 707/101; 707/1; 707/3
(58) Field of Search ................. 707/1, 3, 101, 707/100

(56) References Cited

U.S. PATENT DOCUMENTS

| | | | |
|---|---|---|---|
| 5,572,726 A | * | 11/1996 | Hasuo ...................... 395/616 |
| 5,628,003 A | * | 5/1997 | Fujisawa et al. ............ 395/615 |
| 5,745,745 A | * | 4/1998 | Tada et al. ...................... 707/1 |
| 5,907,835 A | * | 5/1999 | Yokomizo et al. .............. 707/1 |
| 6,055,530 A | * | 4/2000 | Sato .............................. 707/3 |
| 6,341,176 B1 | * | 1/2002 | Shirasaki et al. ........... 382/229 |
| 6,377,946 B1 | * | 4/2002 | Okamoto et al. ............... 707/2 |

FOREIGN PATENT DOCUMENTS

| | | | | |
|---|---|---|---|---|
| JP | 7-044573 | 2/1995 | ........... | G06F/17/30 |
| JP | 7-319903 | 12/1995 | ........... | G06F/17/30 |
| JP | 8-161350 | 6/1996 | ........... | G06F/17/30 |

* cited by examiner

*Primary Examiner*—Safet Metjahic
*Assistant Examiner*—Cam-Linh Nguyen
(74) *Attorney, Agent, or Firm*—Finnegan, Henderson, Farabow, Garrett & Dunner, L.L.P.

(57) ABSTRACT

System and method for filing electronic data as a file with accompanying full-text searching data which is extracted from the text data of the file. A filing process section controls a registering/searching function of the system and extracts full-text searching data from the text data of the file. A searching process section executes registering/searching the extracted full-text searching data for improving system efficiency.

18 Claims, 21 Drawing Sheets

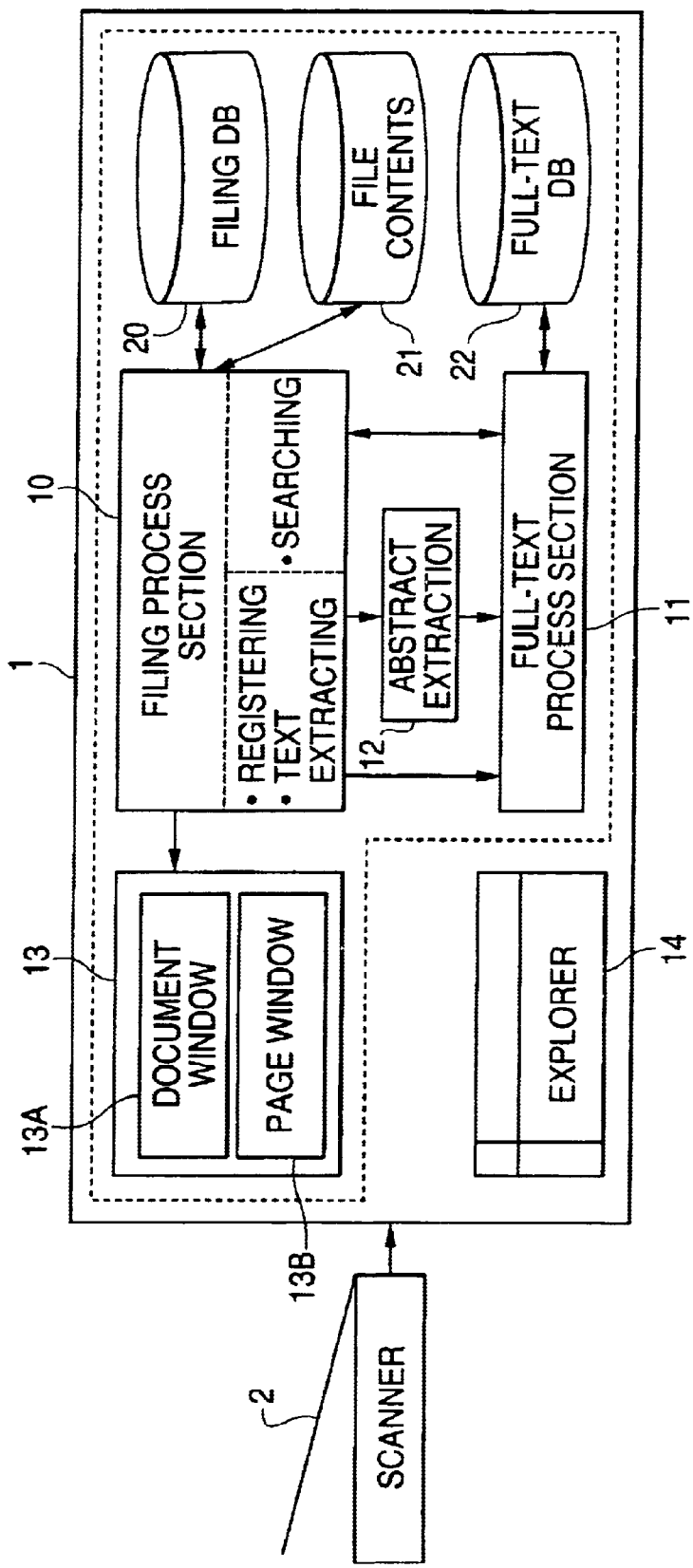

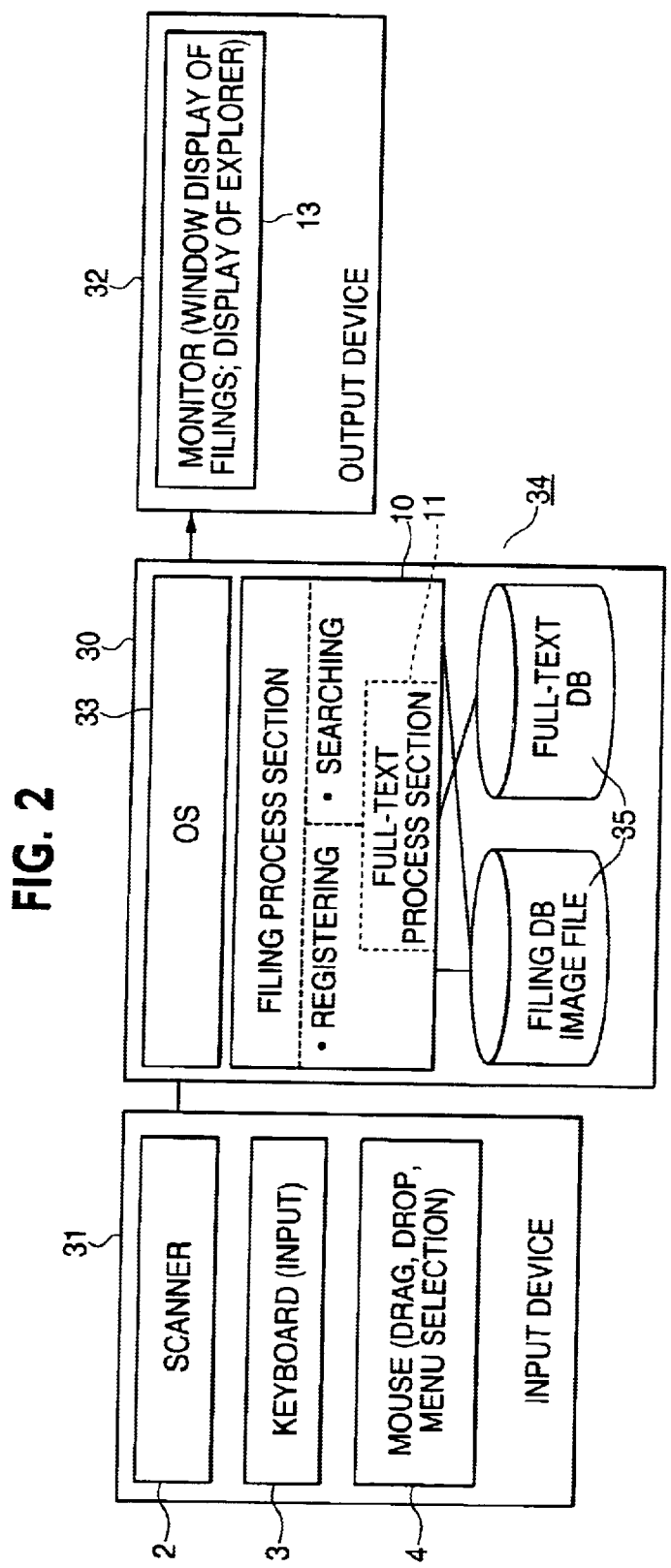

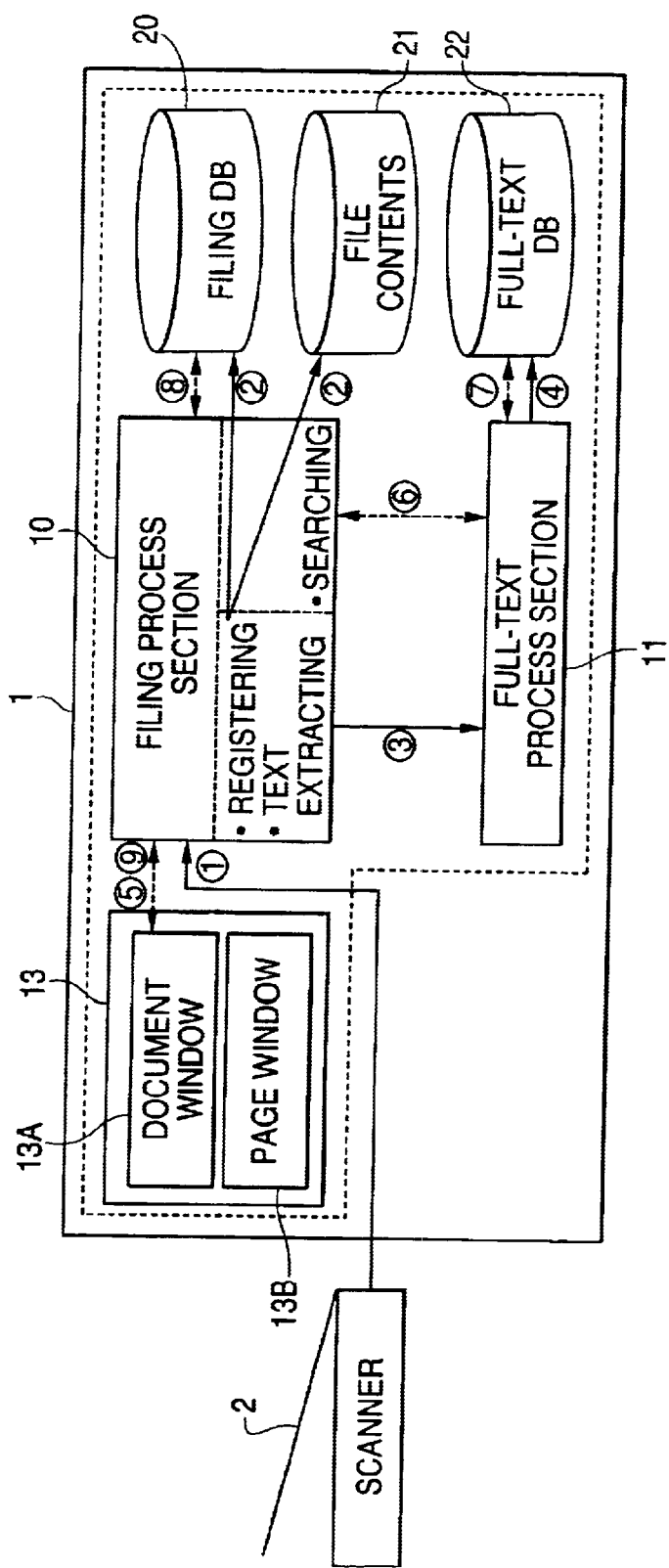

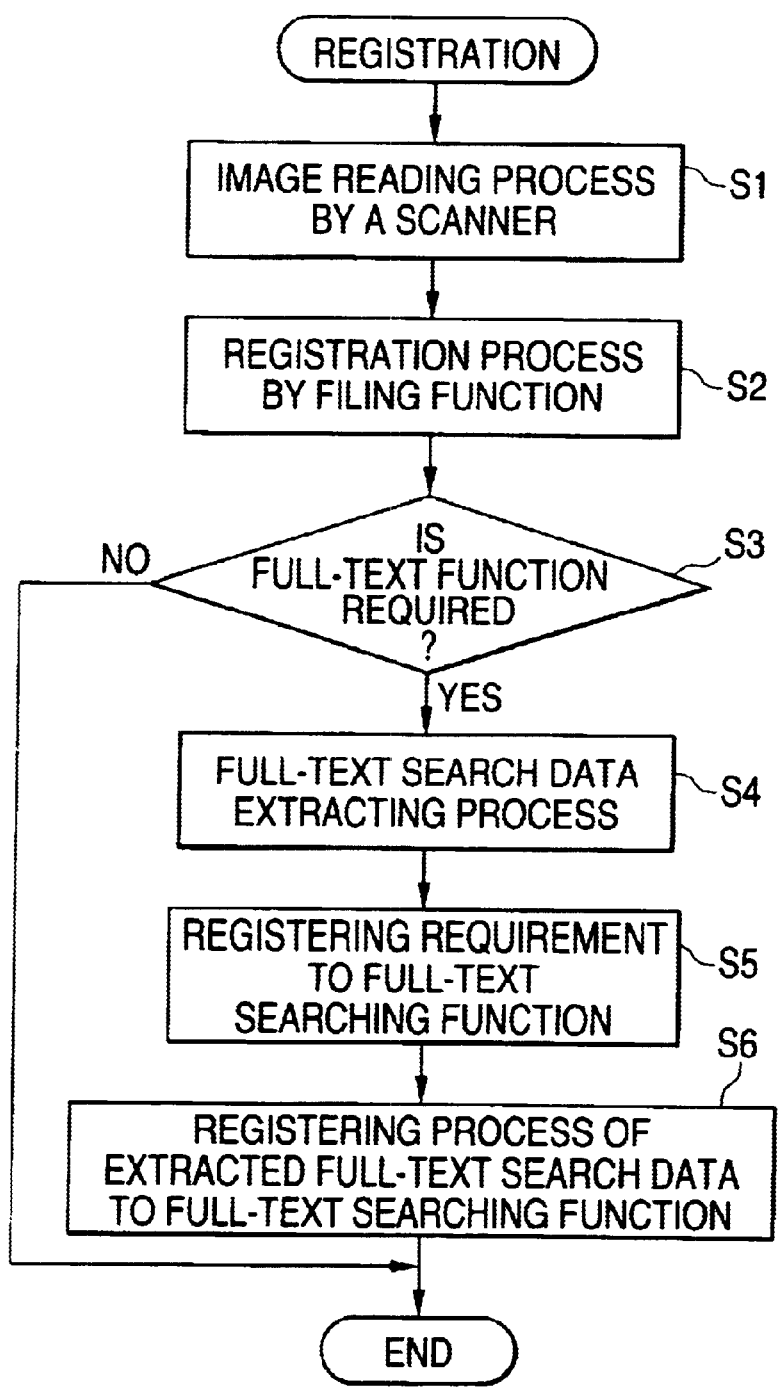

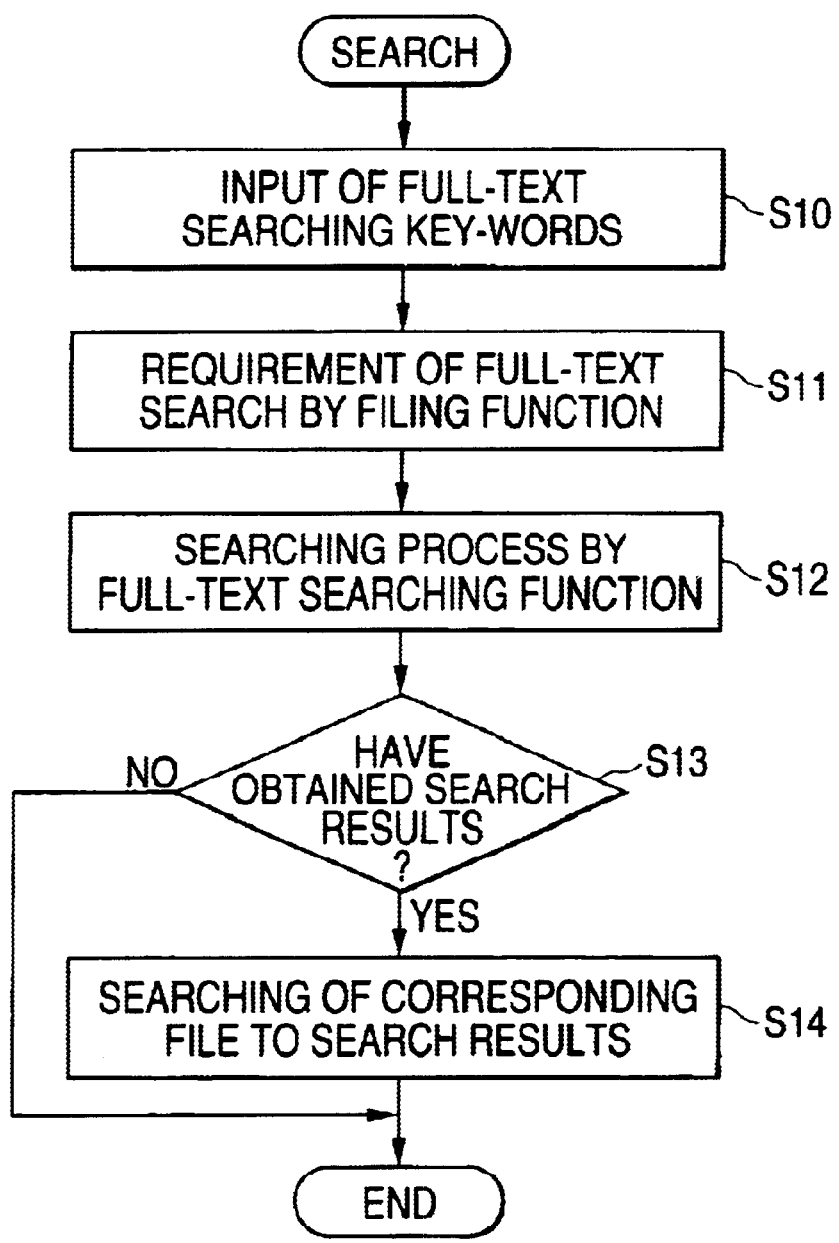

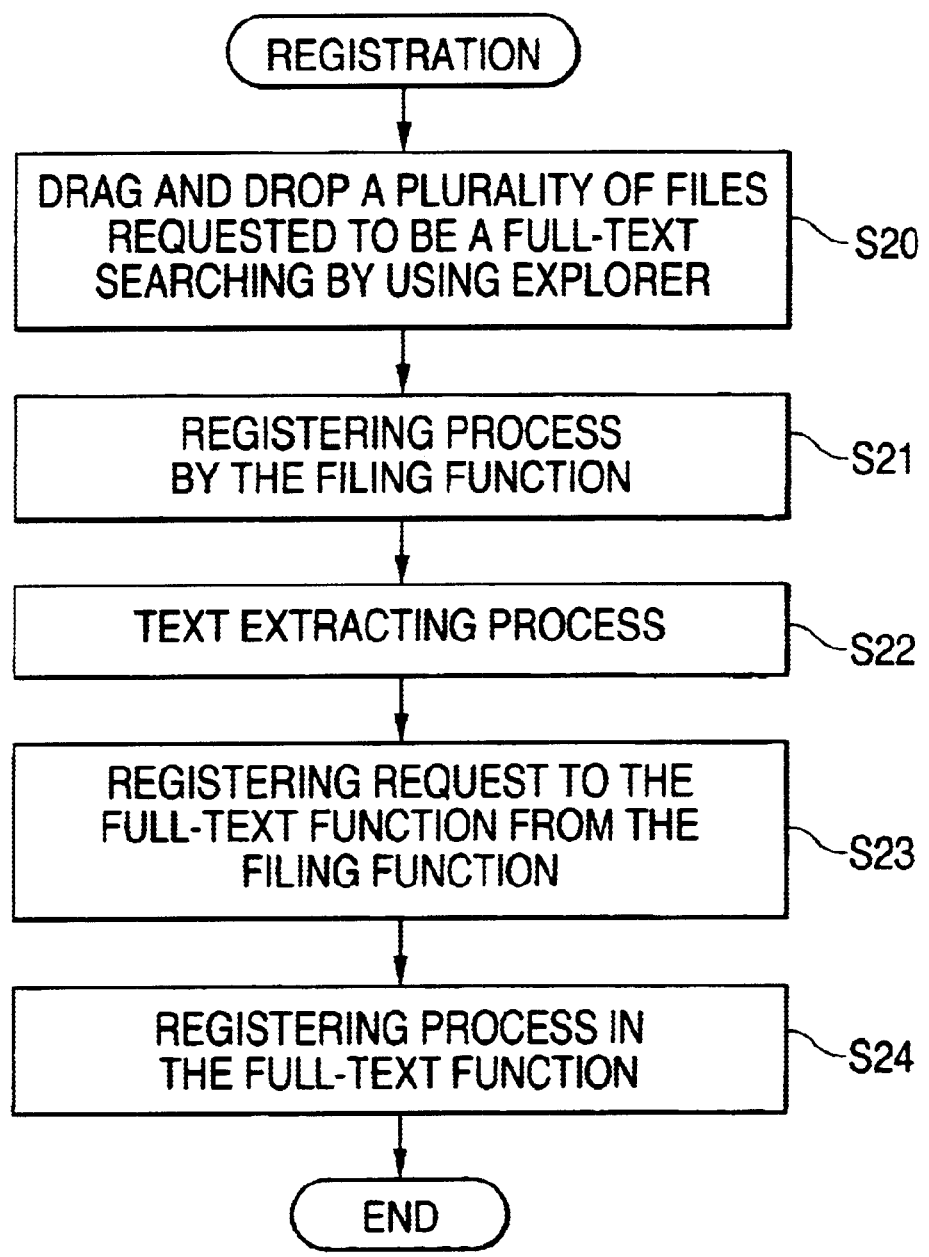

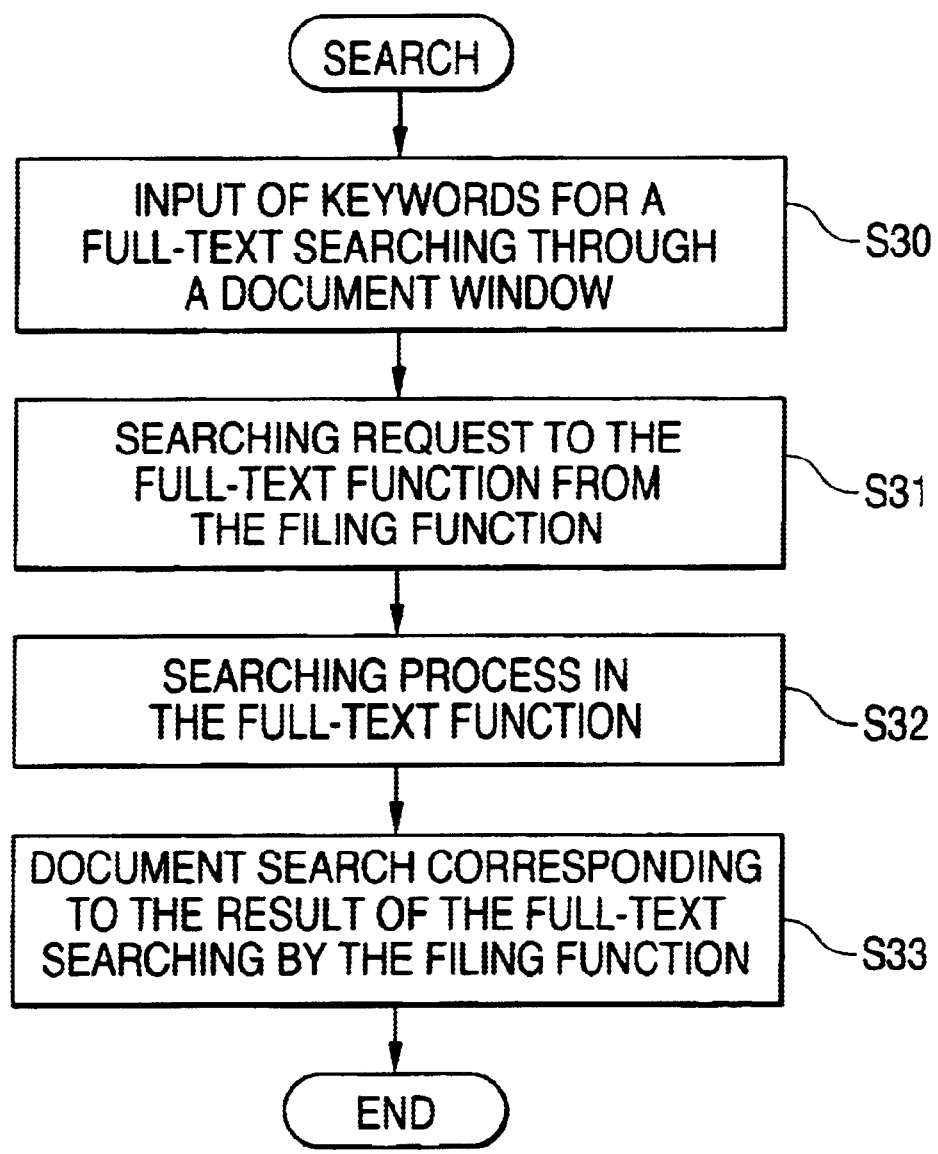

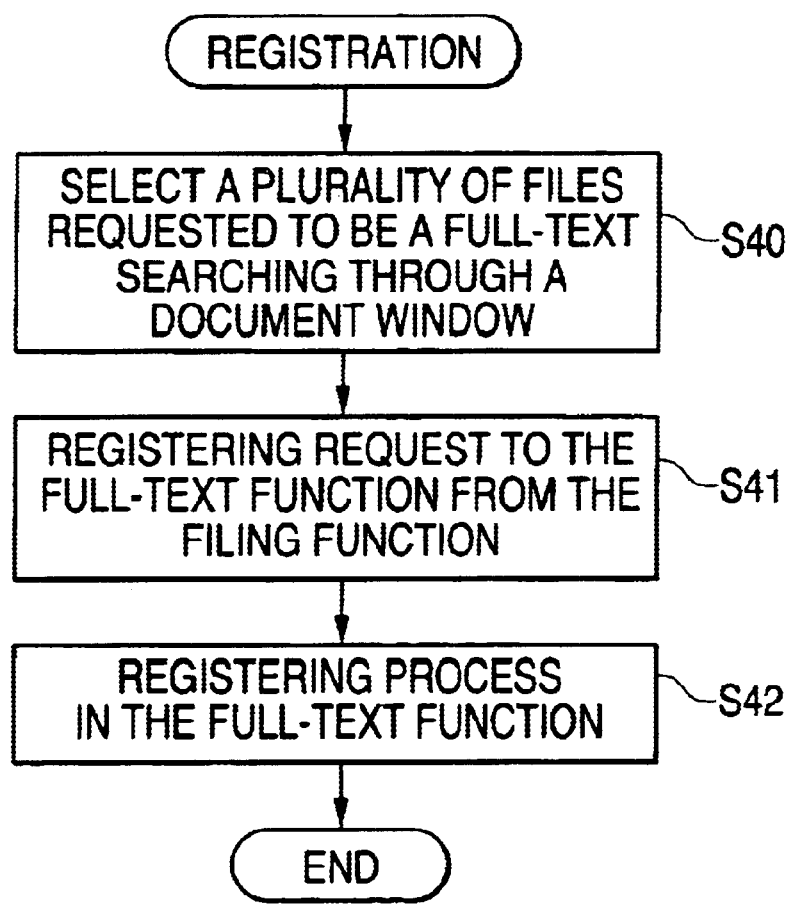

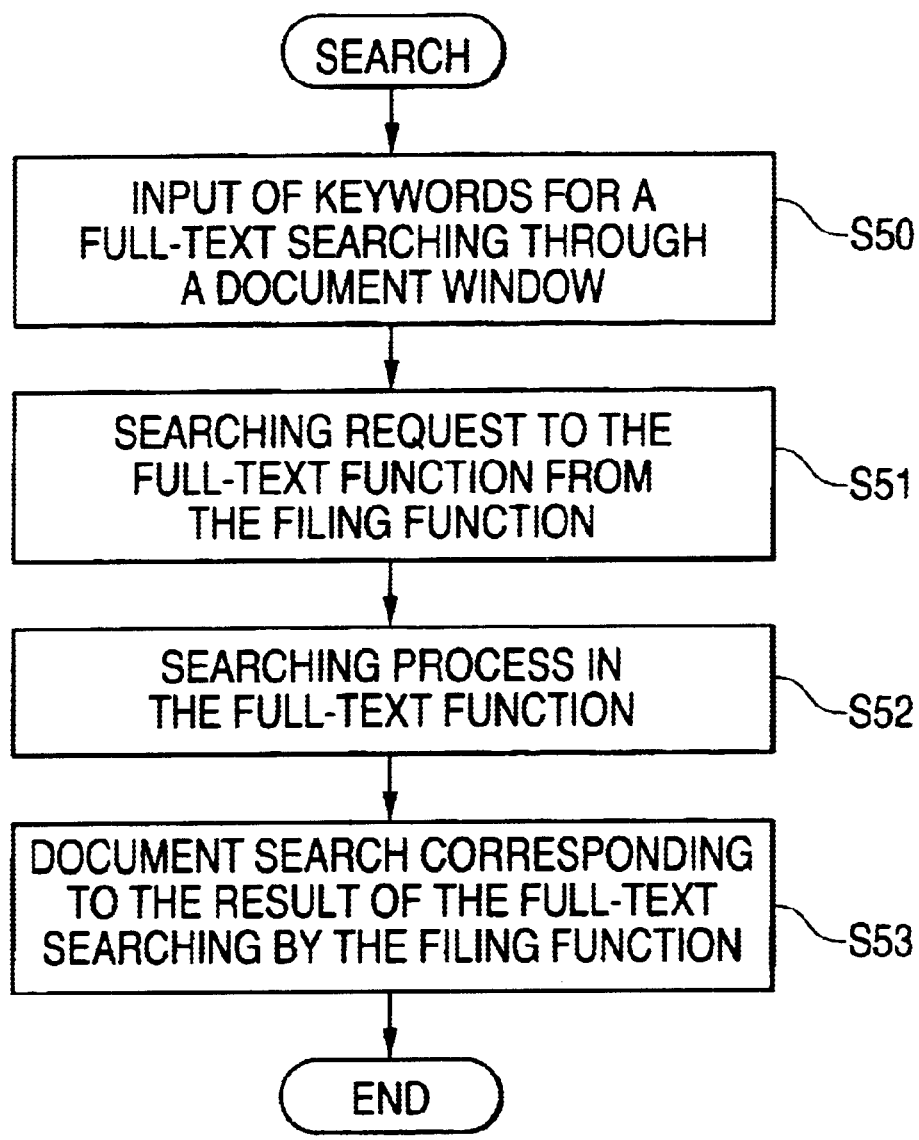

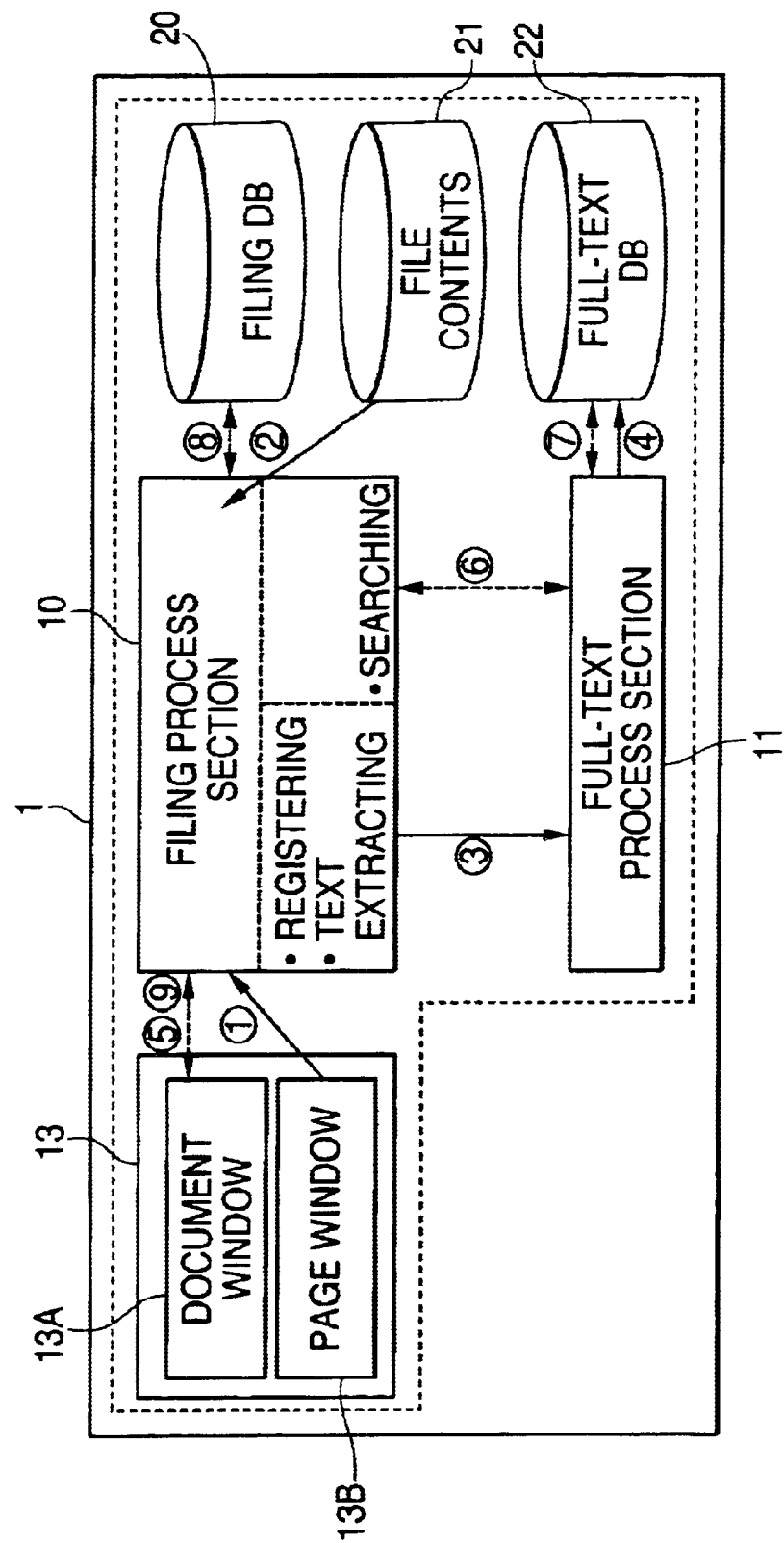

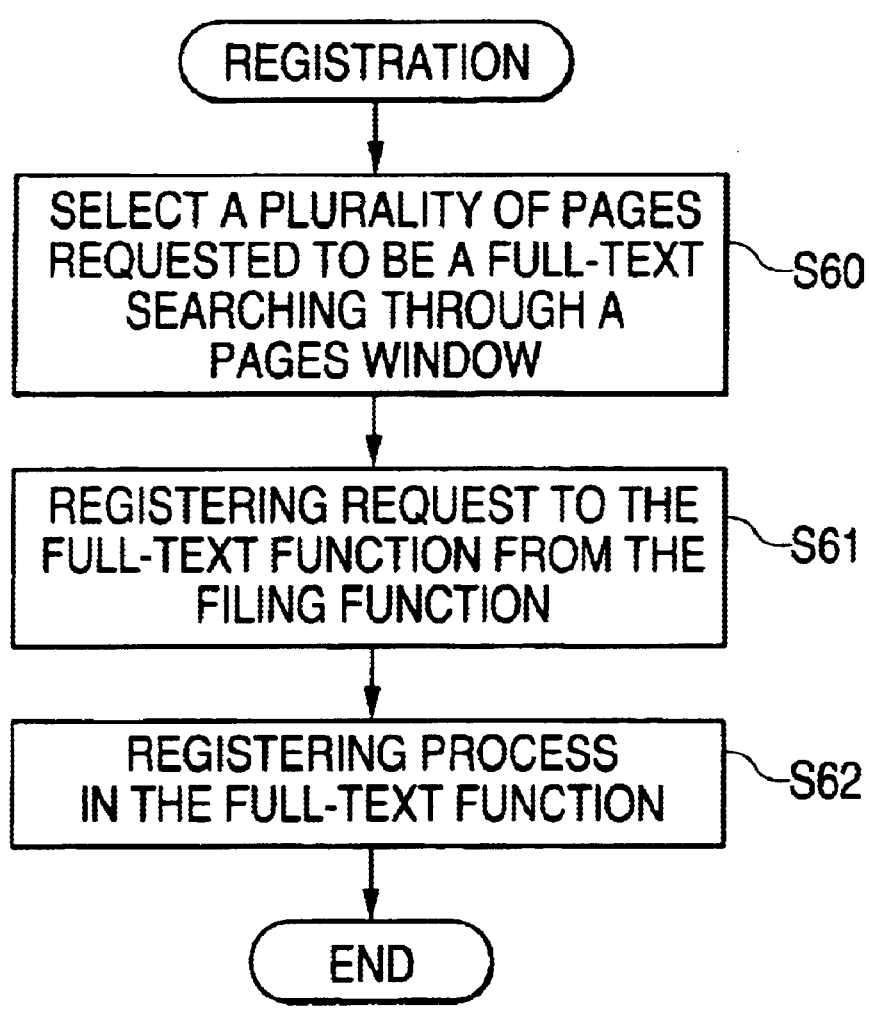

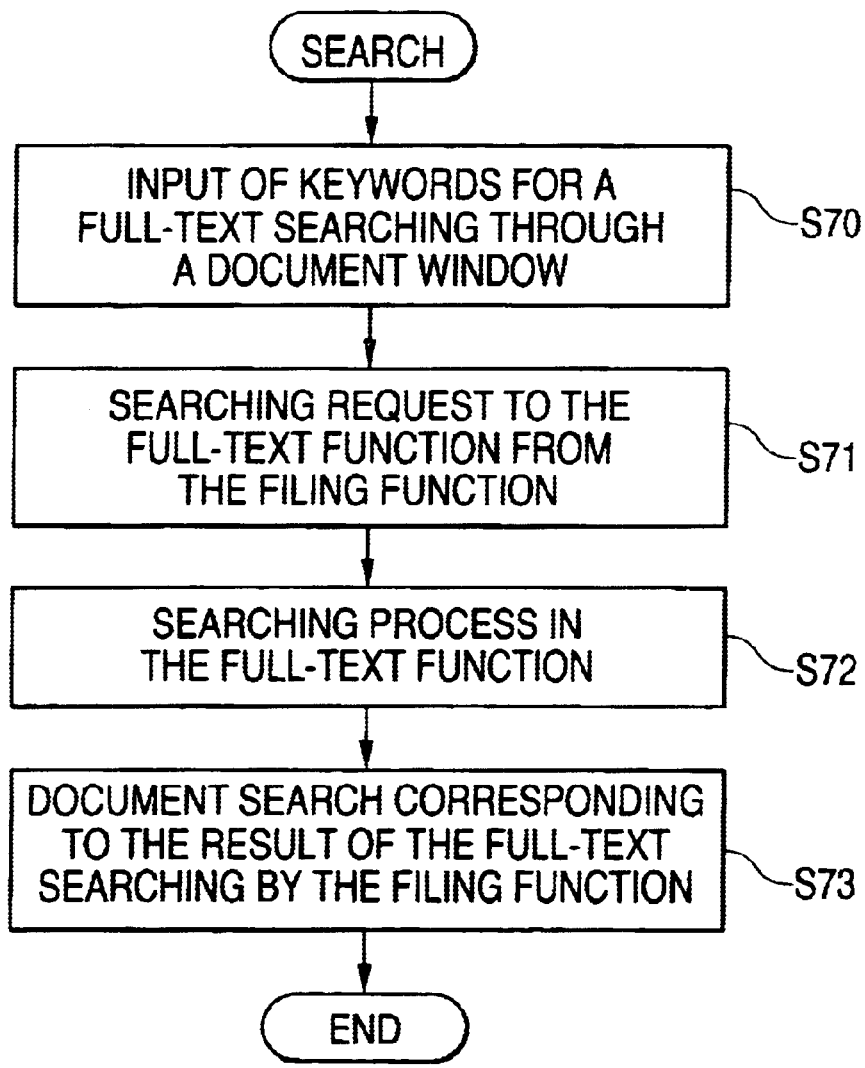

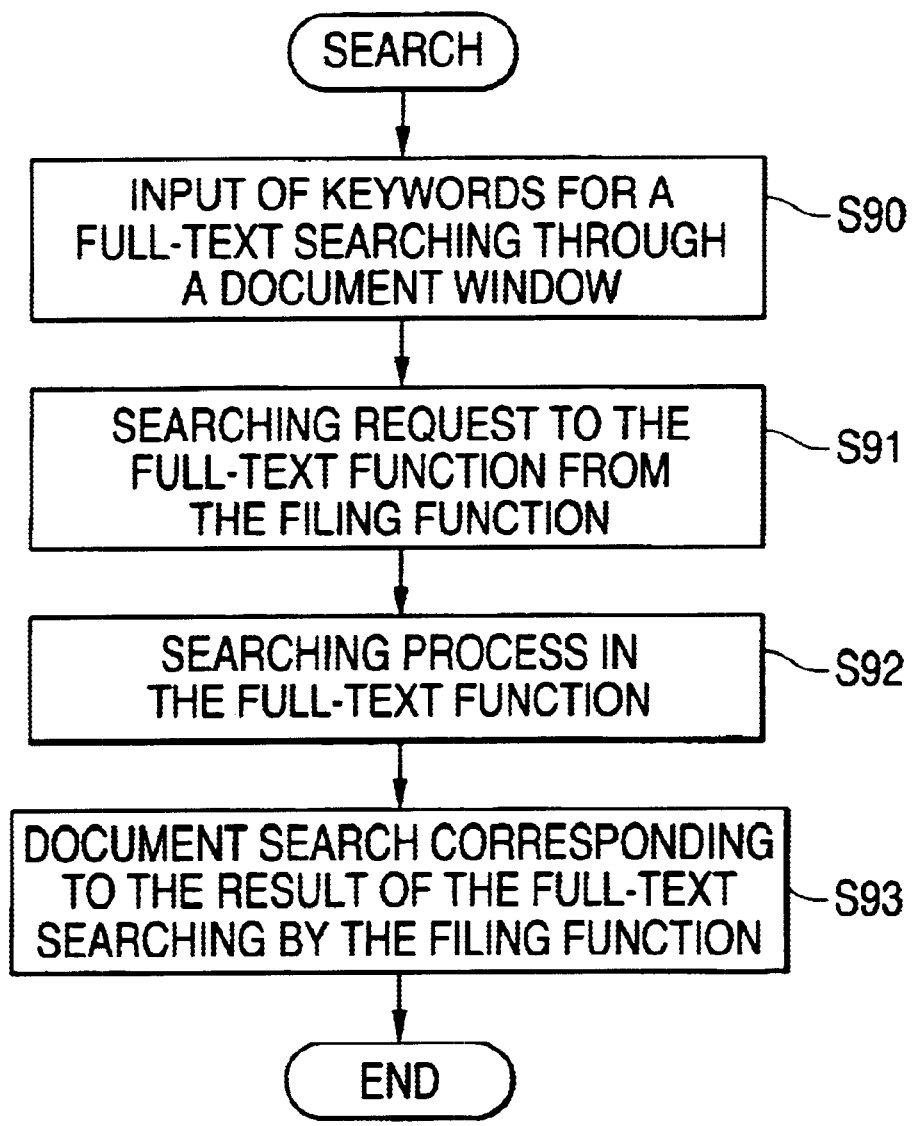

SYSTEM AND METHOD FOR FILING/ SEARCHING DATA HAVING A FULL-TEXT FUNCTION AND MEDIA FOR RECORDING THE METHOD

BACKGROUND OF THE INVENTION

1. Field of the Invention

The present invention relates to a system and method for filing/searching data having a full-text process function. More particularly, the present invention relates to a computer system and method for filing electronic data as a registered file with accompanying full-text searching data for achieving filing/searching efficiencies.

The present invention further relates to a programmed media for storing the filing/searching method having a full-text process function.

2. Discussion of the Related Art

Conventionally, an electronic data filing/searching system utilizing a computer system, in particular utilizing a personal computer system, has been provided for filing electronic data as a registered file and for searching a designated file among the registered files. Such electronic data include both image data inputted through a scanner and character code data, read out from storage media. In general, the electronic data filing/searching function of the system has been performed by application programs installed in a computer system. The image data or the document data are filed in storage media as an image file or a document file. Many types of storage media are utilized for the electronic filing system. For example, a hard-disk drive (HDD) which is installed in a computer system, and an exchangeable disk type, such as a Digital Versatile Disk (DVD), a CD-ROM or a floppy disk (FD) can be utilized for managing many registered files.

In a conventional electronic data filing/searching system using a computer, it is inevitable to execute keyword inputting operations both for registering input data as a file and for searching a particular file among the registered files. That is, a user must select and register particular keywords for registering a file. And the user must input the same particular keywords for searching the file among the registered files. These keywords include a name of the file being registered.

Consequently, the efficiency of the conventional filing/ searching system has depended upon the keyword registering operation. That is, a searching condition has been decided by the keyword registering operation for identifying a registered file. However, it is difficult for a user to initially input sufficient keywords for dealing with various occasions in which a particular searching result is required. That is, the same registered keywords which were decided during a registering operation must be inputted for searching the particular file. Otherwise, a desired particular file is never uncovered by searching among the registered files. Further, it is inevitable to spend time inefficiently for registering a file. Consequently, the conventional electronic filing/ searching system has a serious system efficiency problem.

SUMMARY OF THE INVENTION

There is therefore a need for systems and methods to perform efficient registering/searching of files in an electronic data filing system. Systems and methods according to the present invention solve the aforementioned problems and defects of a conventional electronic data filing system. Goals and advantages of the present invention appear in the following description, and will be obvious from that description or by practicing the present invention.

In accordance with the present invention there is provided an electronic data filing system, comprising: a display means; means for displaying on the display means a list of a plurality of files produced by at least one application program other than ones in the system; means for designating particular files among the listed plurality of files for registering; means for extracting full-text data from the designated particular files; means for registering the full-text data as full-text searching data; and means for searching the full-text searching data based on one or more designated keywords.

Also in accordance with the present invention there is provided an electronic data filing system, comprising: a display means; means for displaying on the display means a list of a plurality of files which have previously been registered in the system; means for designating particular files among the listed plurality of files for registering; means for extracting full-text data from the designated particular files; means for registering the full-text data as full-text searching data; and means for searching the full-text searching data based on one or more designated keywords.

Further in accordance with the present invention there is provided a method for filing electronic data, comprising the steps of: displaying a list of a plurality of files produced by at least one application program other than ones in the system; designating particular files among the listed plurality of files for registering; extracting full-text data from the designated particular files; registering the full-text data as full-text searching data; and searching the full-text searching data based on one or more designated keywords.

Additionally in accordance with the present invention, there is provided a method for filing electronic data, comprising the steps of: displaying on the display means a list of a plurality of files which have previously been registered in the system; designating particular files among the listed plurality of files for registering; extracting full-text data from the designated particular files; registering the full-text data as full-text searching data; and searching the full-text searching based on one or more designated keywords.

An electronic filing system according to the present invention does not need keywords input before registering a file but instead registers extracted full text searching data. Then, the extracted searching data is examined to determine whether or not it includes a designated keyword for searching a particular file. Consequently, system efficiencies of registering/searching can be improved.

BRIEF DESCRIPTION OF THE DRAWINGS

A more complete appreciation of the present invention and many of the attendant advantages will be realized as the same becomes better understood by reference to the following detailed description when considered in connection with the accompanying drawings in which like reference numerals designate identical or corresponding parts throughout the several views.

FIG. 1 is a block diagram of an electronic data filing system consistent with the present invention;

FIG. 2 is a block diagram of a computer system for performing the electronic data filing system consistent with the present invention;

FIG. 3 is a block diagram of a first embodiment of the electronic data filing system consistent with the present invention;

FIG. 4A is a flow chart showing a process for registering files in the first embodiment shown in FIG. 3;

FIG. 4B is a flow chart showing a process for searching files in the first embodiment shown in FIG. 3;

FIG. 7A is a flow chart showing a process for registering files in the second embodiment shown in FIG. 6;

FIG. 7B is a flow chart showing a process for searching files in the second embodiment shown in FIG. 6;

FIG. 10A is a flow chart showing a process for registering files in the third embodiment shown in FIG. 9;

FIG. 10B is a flow chart showing a process for searching files in the third embodiment shown in FIG. 6;

FIG. 12 is a block diagram of a fourth embodiment of electronic data filing system, consistent with the present invention, in which a plurality of files selected by using a page window are collectively registered;

FIG. 13A is a flow chart showing a process for registering files in the fourth embodiment shown in FIG. 9;

FIG. 13B is a flow chart showing a process for searching files in the fourth embodiment shown in FIG. 9;

FIG. 17B is a flow chart showing a process for searching files in the fifth embodiment shown in FIG. 16.

DESCRIPTION OF THE PREFERRED EMBODIMENTS

Figure 5:
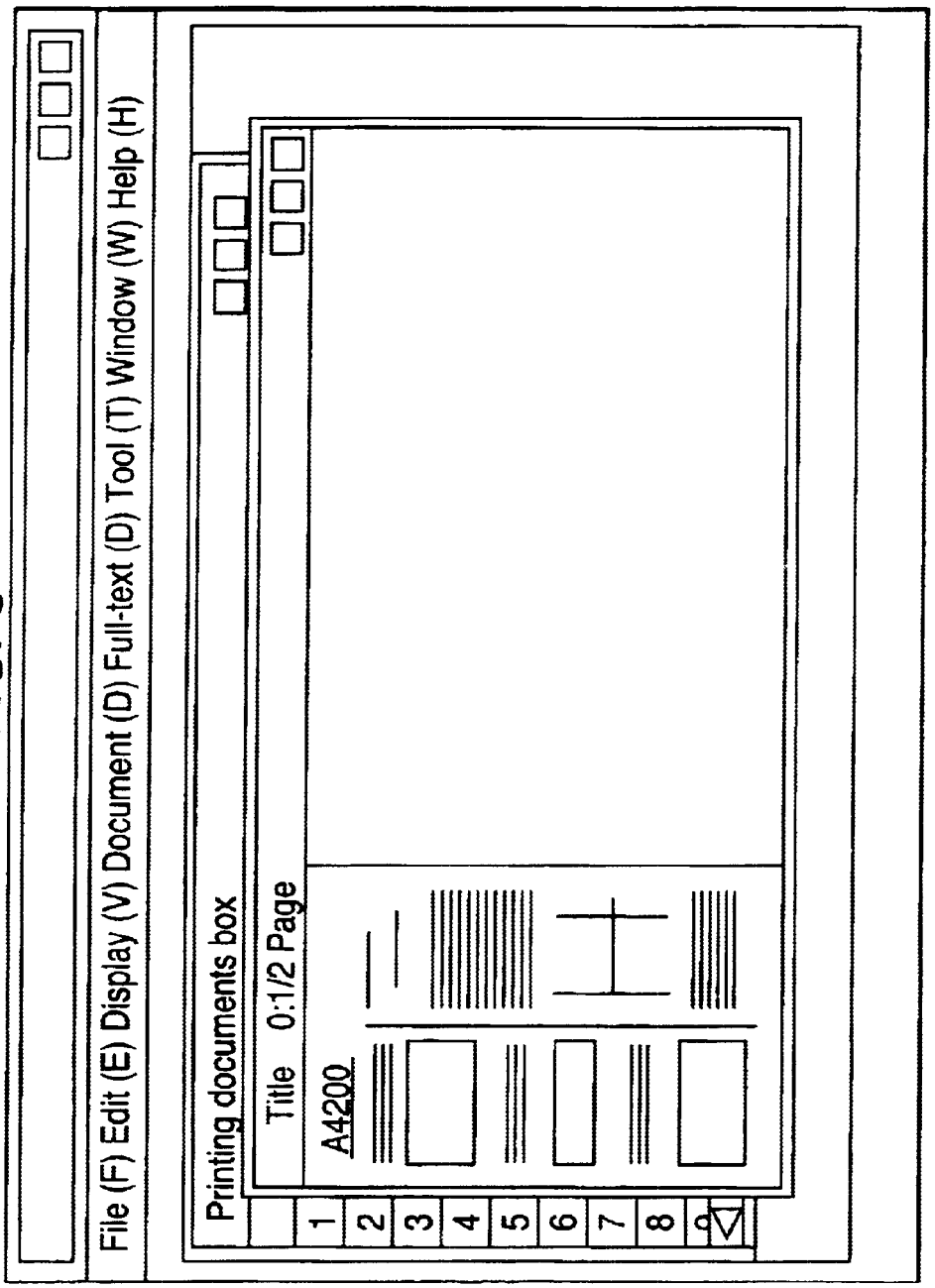
FIG. 5 is a monitor display of a page window used in the electronic data filing system consistent with the present invention.

Reference will now be made in detail to the preferred embodiments of the present invention, examples of which are illustrated in the accompanying drawings.

FIG. 1 illustrates an electronic data filing system 1 consistent with the present invention. The electronic data filing system 1 comprises a filing process section 10, a full-text process section 11 and an abstract extracting section 12. The system 1 receives, for example, an input image file through an image scanner 2. As explained above, electronic data for registering as a file includes both image data inputted through a scanner and character code data read out from storage media. To simplify explanation, hereinafter both types of data are simply referred to as "input data".

The filing process section 10 includes a function for registering the input data in file storage. By the registering function of the filing process section 10, file managing information, such as a title or an address of the registering file are stored in a filing data base storage 20. True data, i.e., the data contents of the registering file, are stored in a file contents storage 21.

Accompanying the registering of input data in the file storage, a function for text extracting of the filing process section 10 performs an extraction operation of text data from the data contents being registered. After extracting the full-text data, the filing process section 10 requests the full-text process section 11 to register the extracted text data as full-text searching data accompanying the registered file. The full-text process section 11 executes the registering operation of the full-text searching data into a full-text data base storage 22.

For improving system efficiency, it is possible to register abstract data to accompany registration of a file. When registration of abstract data is required, the text extracting function of the filing process section 10 transfers the extracted full-text data to an abstract extracting part 12. The abstract extracting part 12 generates abstract data from the extracted full-text data by automatically weighting a predetermined group of keywords or a predetermined number of rows of characters in the extracted full-text data, e.g., a designated page of data. The generated abstract data is registered in the full-text data base storage 22 through the full-text process section 11.

The filing process section 10 further includes a function for searching a designated file among the registered files by utilizing the registered full-text searching data through the full-text process section 11. For performing the searching operation, searching keywords are provided through an input device of the system. The searching function of the filing process section 10 instructs the searching function of the full-text process section 11 to execute a search for full-text searching data which corresponds to designated searching keywords in the full-text database storage 22. The full-text process section 11 sends a search result to the filing process section 10. When particular full-text searching data which includes the designated searching keywords is found among the full-text searching data stored in the database storage 22, the searching function of the filing process section 10 performs an operation for searching a designated file contents from the file contents storage 21 based on particular information in the filing data base storage 20 which corresponds to the particular full-text searching data found by the full-text process section 11. The file contents found in the searching operation are displayed on a monitor 13.

The text extracting function of the filing process section 10 further includes a character recognizing function for converting image input data to character data in order to generate the full-text searching data.

The monitor 13 is further used for selecting a plurality of registered files which are displayed as a window by executing an operation of an explorer 14 or by reading out from the file storage. The window display includes a document window 13A and a page window 13B.

The explorer 14 is a standard function of a personal computer for executing a copying process of a file, as well as a transferring process and a deleting process of the file. Systems according to the present invention utilize the explorer with an accompanying drag and drop function, for collectively registering a plurality of selected files at the same time.

FIG. 2 illustrates the electronic data filing system shown in FIG. 1, implemented utilizing a personal computer system. The computer system comprises a computer body 30, an input device 31, and an output device 32. The computer body 30 executes application programs 40 under control of an operating system (OS) 33. The application programs 40 achieve the functions of the filing process section 10 and the full-text process section function 11 shown in FIG. 1. The computer body 30 further includes hard disk drives 35 for implementing the filing data base storage 20, the file contents storage 21, and the full-text data base storage 22.

The input device 31 includes the scanner 2 shown in FIG. 1, a keyboard 3 for inputting searching keywords, and a mouse 4 for performing drag and drop operations or a menu selecting operation on a monitor display such as the monitor 13.

The output device 32 includes the monitor 13 for performing a display function of the system to provide a window display.

With reference to the drawings, various embodiments of the electronic data filing system consistent with the present invention are now explained. The electronic data filing system according to the present invention can be applicable to register both image files comprised of image data and document files comprised of character data. To simplifying explanation, the following embodiments are explained for a system for registering and searching image files only. The registering and searching process for the image file is basically equivalent to the process for document files except that the former process needs an additional character recognizing step from the inputted image data.

FIG. 3 illustrates a first embodiment of the electronic data filing system 1. FIG. 4A is a flow chart for explaining a registering process in the electronic data filing system shown in FIG. 3. FIG. 4B is a flow chart for explaining a searching process in the electronic data filing system shown in FIG. 3.

For performing the registering operation, the scanner 2 converts a document or a drawing to image data. The image data is supplied to the filing process section 10 in the electronic data filing system 1 (FIG. 3, ①; FIG. 4A, S1). A registering function of the filing process section 10 executes a registering operation of the input image data into the file storage 21 as an image file (FIG. 3, ②-1; FIG. 4A, S2). At the same time, file managing information, such as a file name and an address for the image file are registered in the filing data base storage 20 (FIG. 3, ②-2; FIG. 4A, S2).

The data filing system according to the first embodiment is constructed so that text data is automatically extracted from the input image data by the filing process section 10 for transfer to the full-text process section 11. It is also possible to construct the system so that the filing process section 10 executes the text data extracting operation only when use of the full-text process section 11 is instructed through an input device, such as via a mouse or a keyboard.

By the character recognizing function in the filing process section 10, inputted image data are extracted as text data after the character recognizing step. After extracting the text data, the filing process section 10 sends a request to the full-text process section 11 to register the text data (FIG. 3, ③; FIG. 4A, S3–S5). It is also possible to extract the text data by designating a predetermined scope, e.g., a page, of the input data. The full-text process section 11 registers the required text data in the full-text database 22 as full-text searching data (FIG. 3, ④; FIG. 4A, S6).

With reference to FIGS. 3 and 4B, a searching process in the first embodiment will be explained. For executing the searching process of a registered file, one or more searching keywords are inputted by a user through a document window 13A displayed on the monitor 13 (FIG. 3, ⑤; FIG. 4B, S10). The searching function in the filing process section 10 supplies the inputted full-text searching keywords to the full-text process section 11 as a request for a full-text searching operation (FIG. 3, ⑥; FIG. 4B, S11).

In accordance with the request for full-text searching from the filing process section 10, the full-text process section 11 searches the full-text database 22 to locate any full-text searching data which includes all of the inputted keywords. That is, the full-text process section 11 searches the registered full-text searching data to identify one or more full-text searching data using the inputted keywords. The search results of the full-text process section 11 are supplied to the filing process section 10 for identifying a file name that corresponds to the located full-text searching data (FIG. 3, ⑦; FIG. 4B, S12–S13).

Based on the search results from the full-text process section 11, the filing process section 10 finds the identified file name in the filing database 20 (FIG. 3, ⑧; FIG. 4B, S14). The file processing section 10 displays a result window of the searching on the monitor 13 (FIG. 3, ⑨). FIG. 5 is an example of a page window display which shows a particular page in the searched document.

Thus, according to the first embodiment of the present invention, in the case of registering image files or document files into the electronic data filing system, it is possible to register the text data of the file as full-text searching data.

Figure 6:
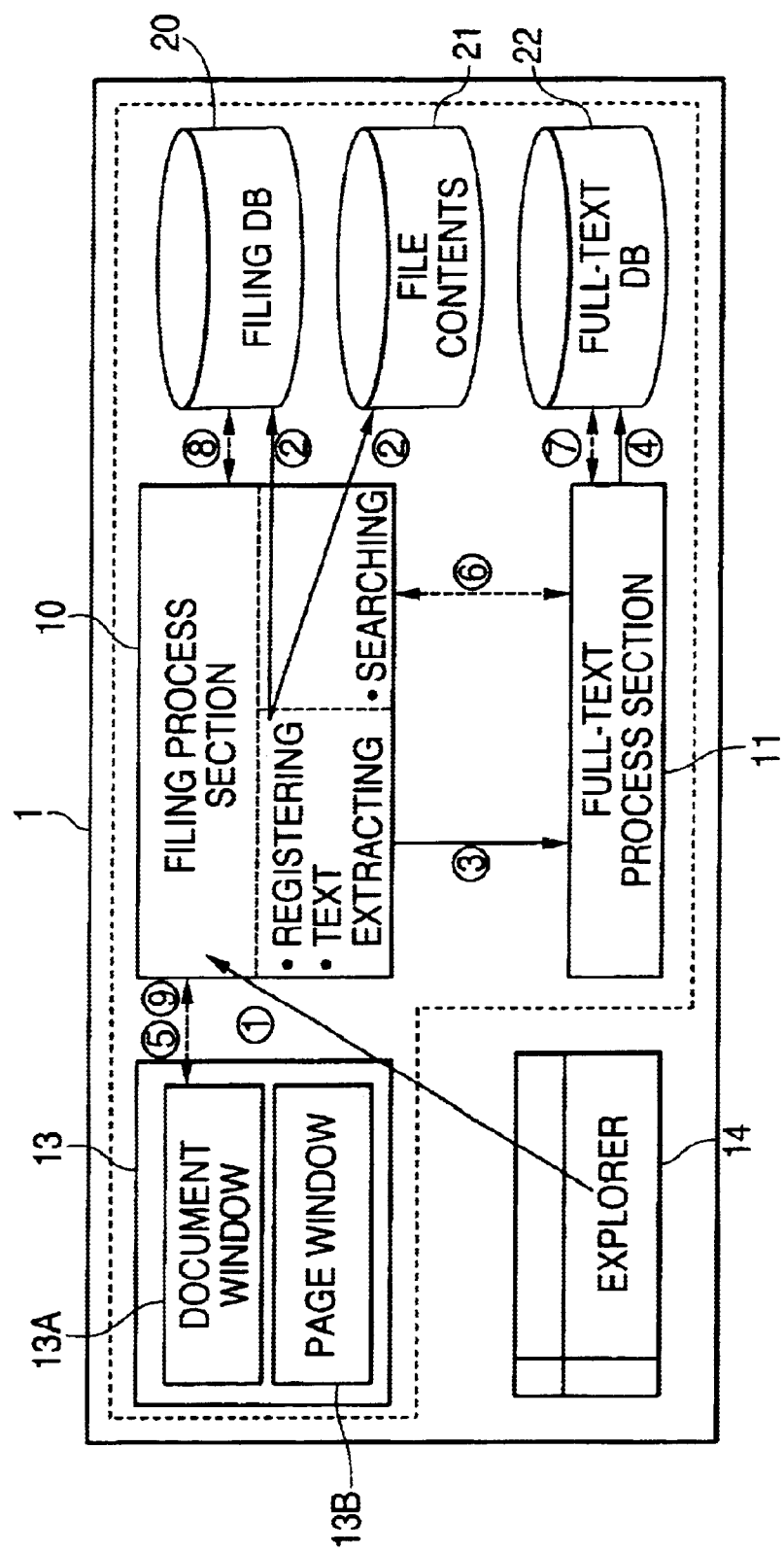
FIG. 6 is a block diagram of a second embodiment of electronic data filing system, consistent with the present invention, in which a plurality of files selected by using an explorer are collectively registered.

FIGS. 6, 7A and 7B show a second embodiment of the electronic filing system 1 consistent with the invention. A characteristic feature of this embodiment is to collectively register a plurality of files as one file with the respective text data as the full-text searching data by using the explorer function. The plurality of files are produced by application programs other than the ones in the electronic filing system.

Figure 8:
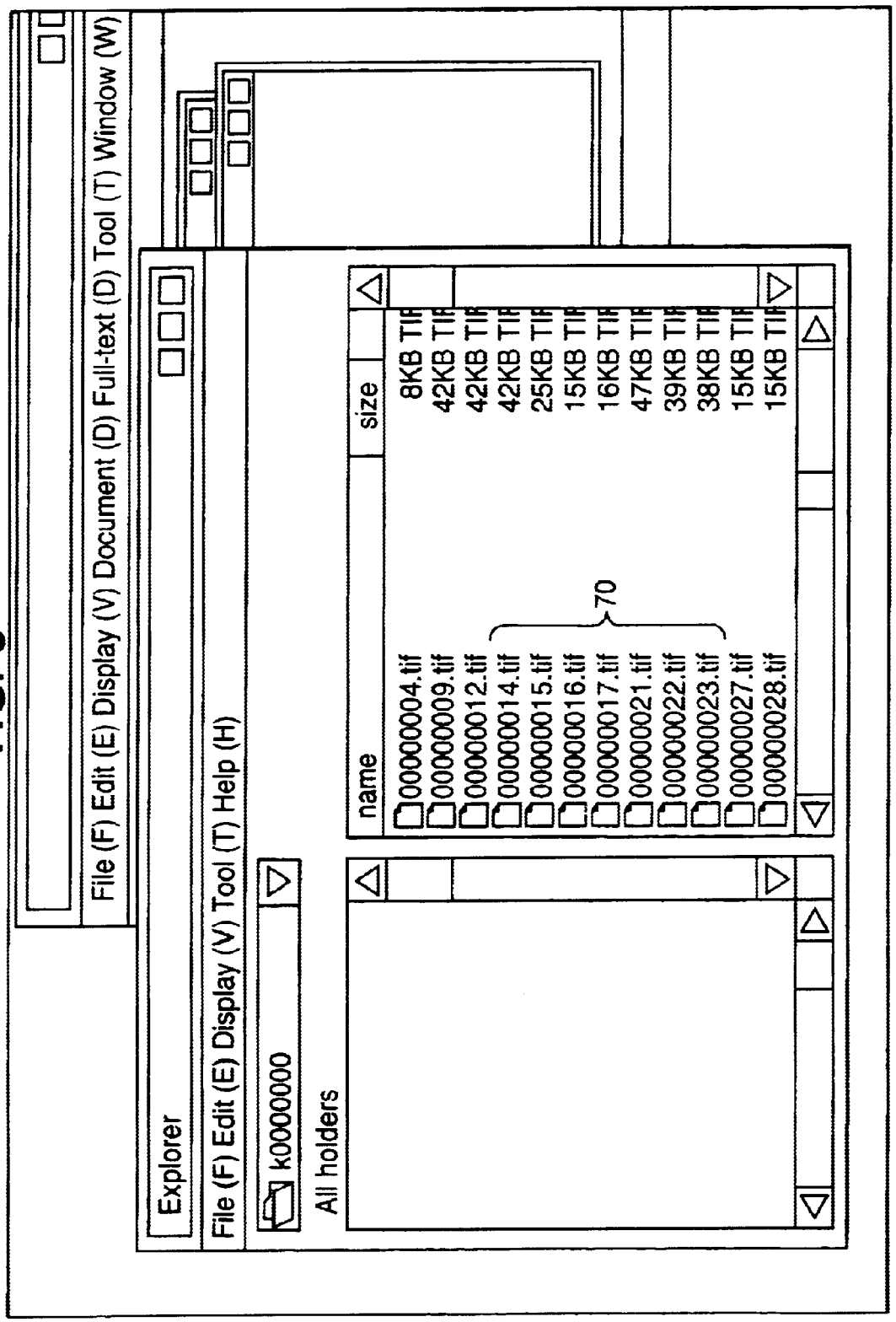
FIG. 8 is a monitor display generated by using the explorer in the electronic data filing system.

By starting the explorer 14, a list of new document files or new image files which are produced by application programs other than the electronic data filing system is displayed on the monitor. FIG. 8 illustrates an example display of the explorer starting. On the monitor display, a plurality of files 70 are selected for registering by a drag and drop operation of the mouse 4 in the input device, such as shown in FIG. 8. Then the process for the selected files is transferred to the filing process section 10 (FIG. 6, ①; FIG. 7A, S20). The filing process section 10 executes the registration of the selected plurality of files to the file storage 21. Simultaneously, managing information for the selected files is registered in the filing database storage 20 (FIG. 6, ②; FIG. 7A, S21).

After registering a file, the character recognizing function of the filing process section 10 extracts text data of the image file (FIG. 7A, S22). Then, the filing process section 10 requests the full-text process section 11 to register the extracted text data (FIG. 6, ③; FIG. 7A, S23). The full-text process section 11 executes the register operation of the extracted text data into the full-text database 22 as full-text searching data (FIG. 6, ④; FIG. 7A, S24).

After registering a plurality of selected files as one file by using the explorer function, a searching process for the file can be performed as explained next with reference to FIGS. 6 and 7B.

The searching process for a particular file is started by designating full-text searching keywords in the document window 13A on the monitor 32 (FIG. 6, ⑤; FIG. 7B, S30). The filing process section 10 sends a request to the full-text process section 11 to search full-text data based on the designated searching keywords (FIG. 6, ⑥; FIG. 7B, S31).

The full-text process section 11 searches the full-text database 22 to find particular full-text searching data that includes the designated searching keywords (FIG. 6, ⑦; FIG. 7B, S32). Based on search results of the full-text process section 11, the filing process section 10 searches for the particular file which corresponds to the search results in the filing database 20 (FIG. 6, ⑧; FIG. 7B, S33). And the filing process section 10 displays the corresponding particular file on the document window 13A (FIG. 6, ⑨).

According to the second embodiment of the electronic data filing system 1 consistent with the invention, by utilizing the explorer and drag and drop functions which are standard functions in a personal computer, a plurality of files can be collectively registered as a package file with accompanying full-text searching data for the respective files. Consequently, system efficiency for registering/searching of a plurality of files can be improved.

A third embodiment of the electronic data filing system 1 consistent with the invention, will be explained with reference to FIGS. 9, 10A and 10B. This embodiment is characterized in that a plurality of files which have been registered in the electronic data filing system 1 are displayed and selected for collectively registering with accompanying full-text searching data for the respective files by using the document window 13A.

Figure 11:
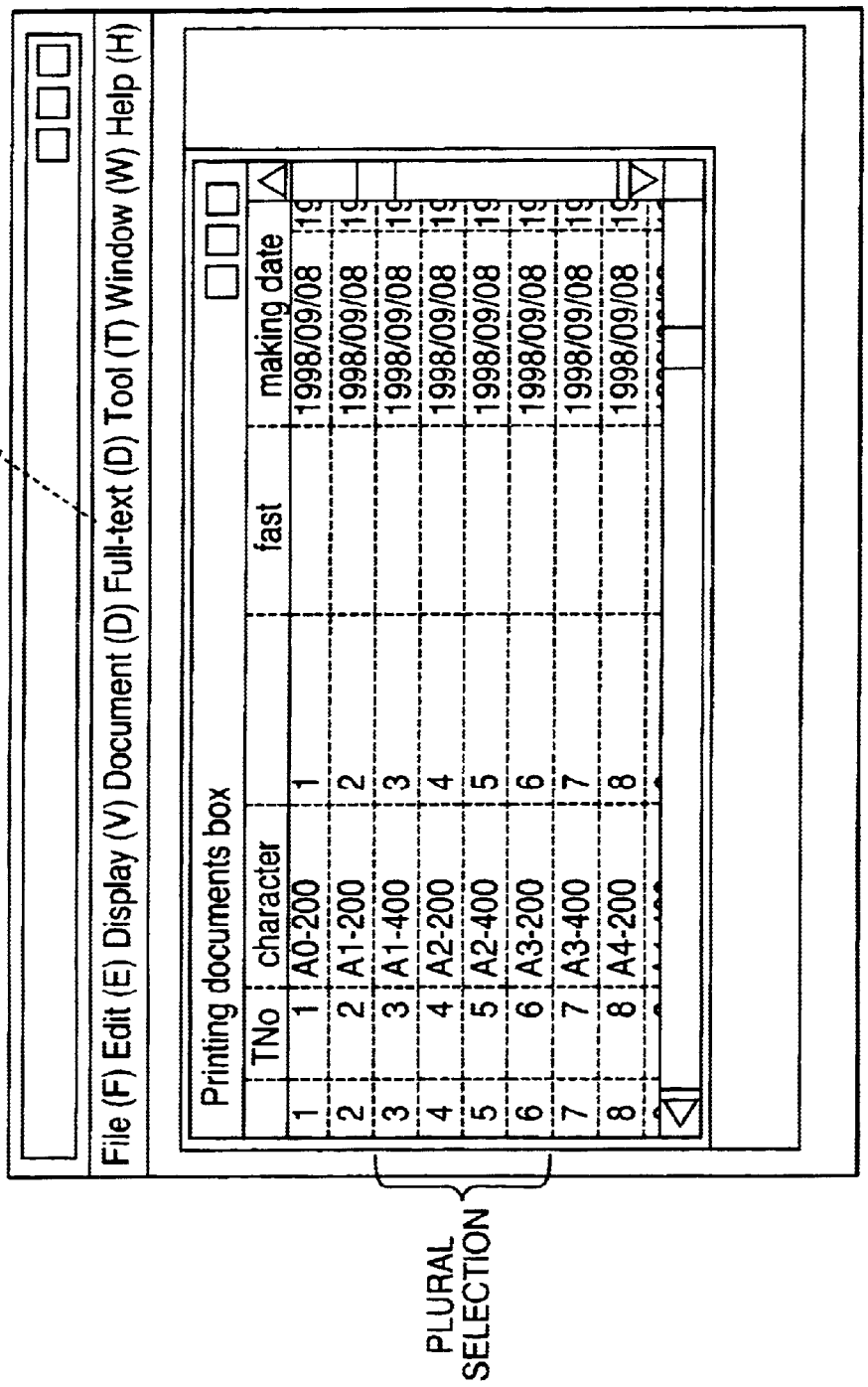
FIG. 11 is a monitor display of a document window for showing an example of package registration.

The filing process section 10 executes a displaying operation of a plurality of registered files in the system using the document window 13A on the monitor 32. FIG. 11 shows an exemplary display of a list of a plurality of registered files in the document window 13A. By operating the mouse 4, a plurality of files that are desired to be registered with full-text searching data are selected among the listed plurality of files in the document window 13A. In FIG. 11, for example, a plurality of files nos. 3–6 are selected as a collective file. (FIG. 9, ①; FIG. 10A, S40).

Figure 9:
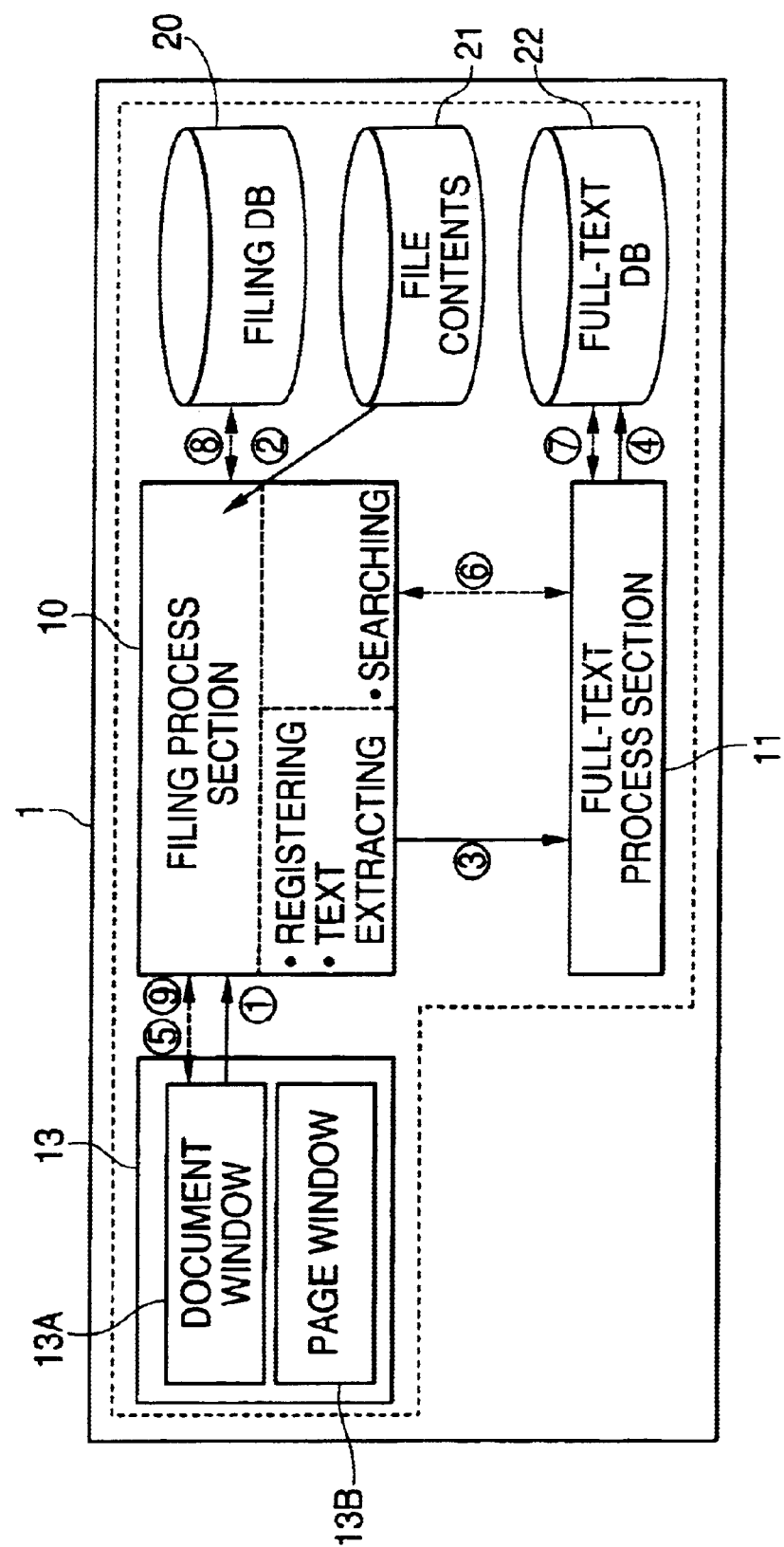
FIG. 9 is a block diagram of a third embodiment of electronic data filing system, consistent with the present invention, in which a plurality of files selected by using a document window are collectively registered.

The filing process section 10 reads the selected registered files from the file contents storage 21 (FIG. 9, ②). When the plurality of read files are image files, the character recognizing function of the filing process section 10 extracts the image file. If the plurality of read files are document files, the text extracting function of the filing process section 10 extracts the text data. The filing process section 10 requests the full-text process section 11 to register the extracted text data (FIG. 9, ③; FIG. 10A, S41). The full-text process section 11 registers the requested text data into the full-text database 22 as full-text searching data for the respective selected files (FIG. 9, ④; FIG. 10A, S42).

FIGS. 9 and 10B explain a process for searching the collectively registered plurality of files. For the searching process, one or more full-text searching keywords are inputted through the document window 13A on the monitor 32 (FIG. 9, ⑤; FIG. 10B, S50). The filing process section 10 sends a request to full-text process section 11 for executing a full-text search based on the inputted keywords (FIG. 9, ⑥; FIG. 10B, S51). The full-text process section 11 accesses the full-text database storage 22 to search for a particular full-text searching data that includes the inputted searching keywords. The full-text process section 11 sends search results to the filing process section 10 (FIG. 9, ⑦; FIG. 10B, S52).

In accordance with the search results from the full-text process section 11, the filing process section 10 searches the filing database storage 20 to obtain a particular file name which corresponds to the searching full-text data in the search results (FIG. 9, ⑧, FIG. 10B, S53). The obtained file name is displayed on the document window 13A (FIG. 9, ⑨).

Thus, according to the third embodiment, it becomes possible to collectively transfer a plurality of registered files in the system to the full-text function for improving the efficiency of the full-text registering/searching process.

With reference to FIGS. 12, 13A and 13B, a fourth embodiment of the electronic filing system 1 according to the present invention will be explained. This embodiment is characterized in that a plurality of pages selected among the registered files in the electronic data filing system are registered with accompanying respective full-text searching data which are comprised of text data in the selected pages.

The filing process section 10 reads a plurality of designated image files or document files from the file contents storage 21 and displays each page of them in the page window 13B on the monitor 32. By using the mouse 4, several pages among the displayed pages are selected for registering with full-text searching data. (FIG. 12, ①, ②; FIG. 13A, S60). As shown in FIG. 5, the page window shows a selected page. A user can confirm full-text searching data by the displayed contents in the page window.

The filing process section 10 generates text data from the selected page data. When the page data are image data, the character recognizing function of the filing process section 10 converts the image data to text data for extracting text data. When the page data are character data, the extracted text data are generated by a filtering function of the filing process section 10. The generated text data are supplied to the full-text process section 11 for registering (FIG. 12, ③; FIG. 13A, S61). The full-text process section 11 executes the registering operation of the text data for the selected page to the full-text database storage 22 as full-text searching data (FIG. 12, ④; FIG. 13A, S62).

FIGS. 12 and 13B explain a searching process for the registered files based on the selected page data.

For the searching process, one or more full-text searching keywords are designated through the document window 13A on the monitor 32 (FIG. 12, ⑤; FIG. 13B, S70). The filing process section 10 requests the full-text process section 11 to search for full-text data based on the designated keywords (FIG. 12, ⑥; FIG. 13B, S71). The full-text process section 11 accesses the full-text database storage 22 to search for full-text searching data corresponding to the designated searching keywords. The search results of the full-text process section 11 are sent to the filing process section 10 (FIG. 12, ⑦, FIG. 13B, S72). Based on the search results, the filing process section 10 obtains a particular file name of the file which includes the designated searching keywords from the filing database 20 (FIG. 12, ⑧; FIG. 13B, S73). The particular file name is displayed on the window 13A (FIG. 12, ⑨).

According to the fourth embodiment, it becomes possible to register particular pages in the designated image files or the document files which have been filed in the system through the full-text searching function. That is, the text data which are contained in the designated page can be collectively registered as searching data by utilizing the full-text searching function. Consequently, system efficiency of the registering and searching files is highly improved.

Figure 14:
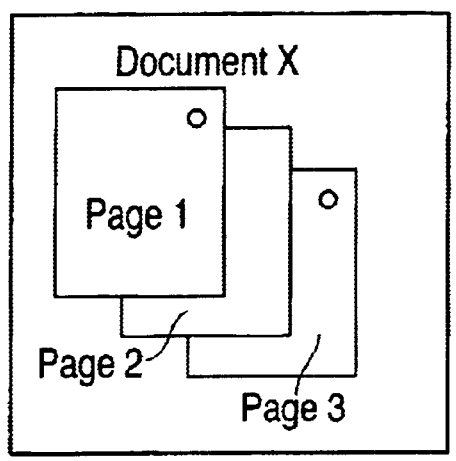
FIG. 14 shows an example of package registration of a plurality of selected pages in a document.

FIG. 14 shows an example of the collective registering of a plurality of pages, e.g., pages 1 and 3, in one document X which is registered as a file with the accompanying respective full-text searching data.

Figure 15:
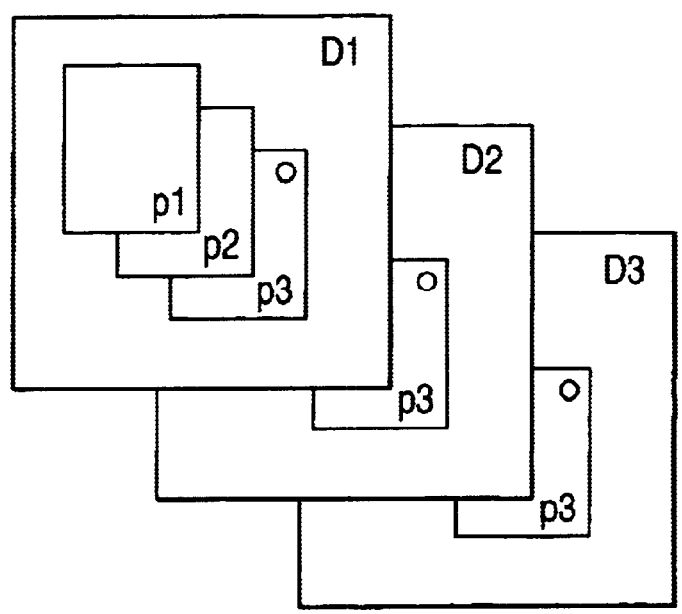
FIG. 15 shows an example of package registration of a plurality of selected particular pages displayed in a plurality of documents.

FIG. 15 shows an example of the collective registering of a particular page, e.g., page 3, in a plurality of documents D1–D3 with the accompanying respective full-text searching data.

According to the electronic data filing system consistent with the invention, it becomes possible to collectively register a plurality of pages of the selected documents with the accompanying respective full-text searching data as a package file. It is also possible to register a package file by selecting one or more pages among a plurality of documents.

Figure 16:
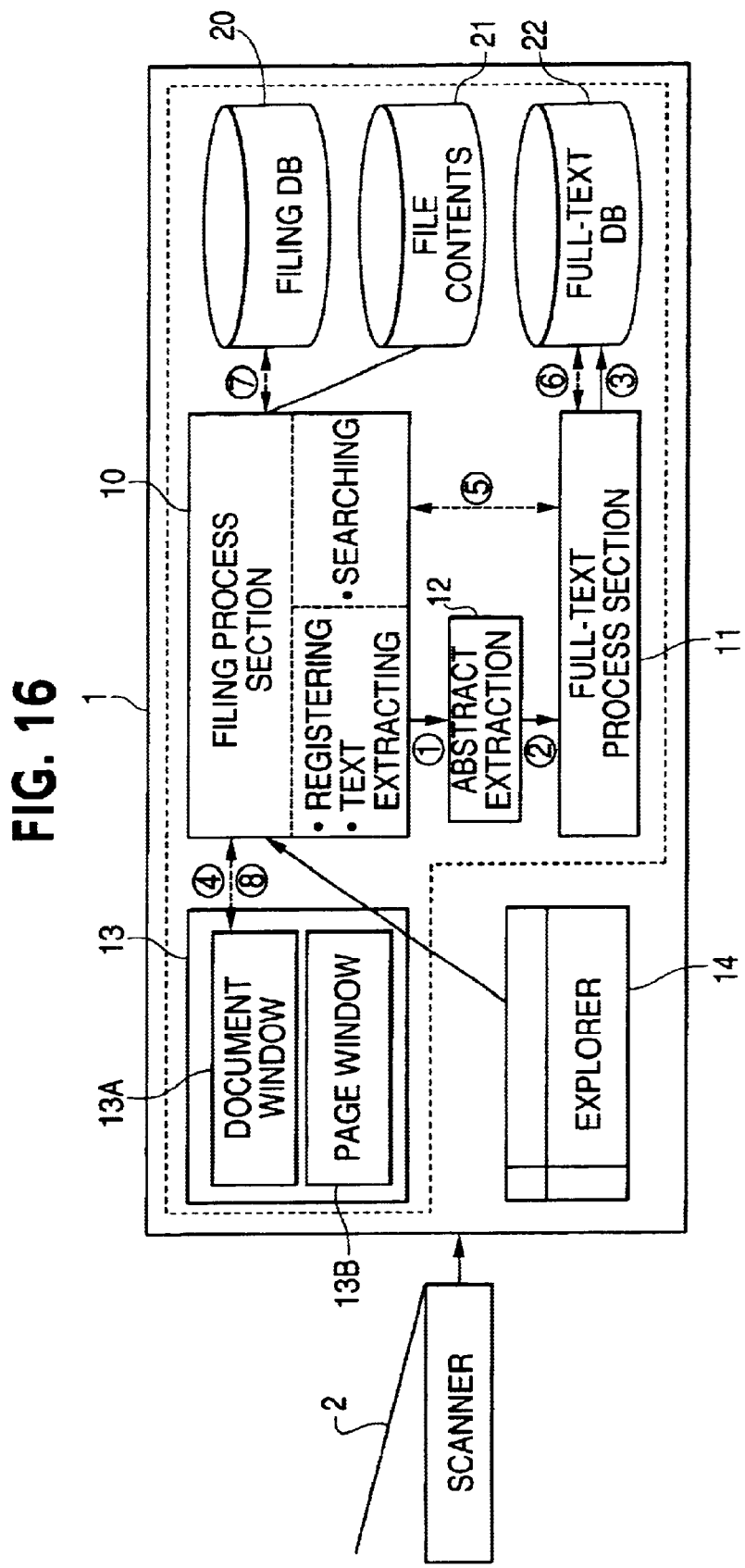
FIG. 16 is a block diagram of a fifth embodiment of electronic data filing system, consistent with the present invention, in which an abstract is registered as full-text searching data.
Figure 17A:
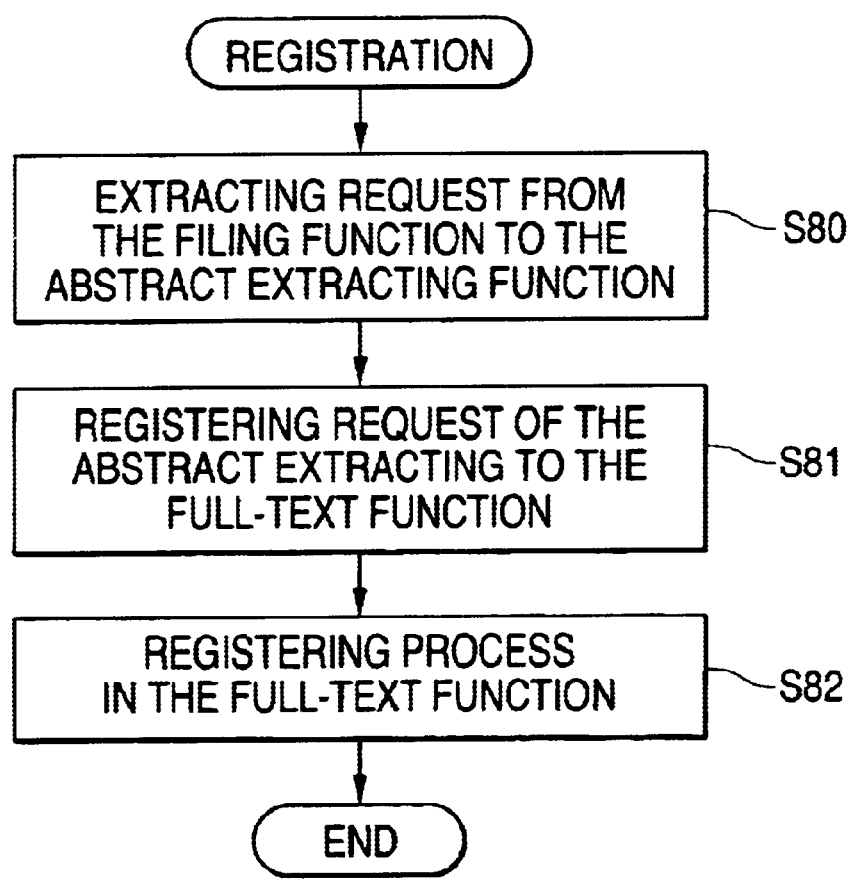
FIG. 17A is a flow chart showing a process for registering files in the fifth embodiment shown in FIG. 16.

With reference to FIGS. 16, 17A, and 17B, a fifth embodiment of the electronic data filing system 1 consistent with the present invention will be explained. The fifth embodiment is characterized in that abstract data are extracted for registering as the full-text searching data. The extracted abstract registering function is applicable to all of the previous embodiments.

FIGS. 16 and 17A explain a registering process in the fifth embodiment. The filing process section 10 executes an extracting operation of text data from a designated image file or a document file. Then the filing process section 10 requests the abstract extracting section 12 to generate an abstract of the extracted text data (FIG. 16, ①; FIG. 17A, S80). In case the extracted text data are image data, the character recognizing function of the filing process section 10 extracts the text data. In case the extracted text data are character data, the text extracting function of the filing process section 10 extracts text data for supplying to the abstract extract section 12.

The abstract extracting section 12 generates abstract data from the extracted text data by extracting a group of keywords which are weighted by a predetermined amount from, for example, designated page data or a predetermined number of character strings in the text data. The weighting is performed by counting the appearance frequencies for the respective keywords in the text data and arranging them in order of frequency. Some of the keywords having frequencies higher than a predetermined frequency are selected and registered as an abstract. Another way to produce abstract data is by extracting a predetermined scope of the text, e.g., extracting a predetermined number of character strings from the top of the text. The filing process section 10 requests the full-text process section 11 to register the abstract data generated by the abstract extracting section 12 (FIG. 16, ②; FIG. 17A, S81). The full-text process section 11 executes the registering operation of the requested abstract data, i.e., extracted text data, to the full-text database 22 as full-text searching data (FIG. 16, ③; FIG. 17A, S82).

A searching process in the fifth embodiment will be explained with reference to FIGS. 16 and 17B. For the searching process, one or more full-text searching keywords are designated in the document window 13A on the monitor 32 (FIG. 16, ④; FIG. 17B, S90). The filing process section 10 sends a request to the full-text process section 11 to perform a full-text search based on the inputted keywords (FIG. 16, ⑤; FIG. 17B, S91). The full-text process section 11 accesses the full-text database storage 22 to search for abstract data that include the inputted keywords. The full-text process section 11 delivers search results to the filing process section 10 (FIG. 16, ⑥). Based on the full-text search results of the abstract data, the filing process section 10 searches for a file name, corresponding to the search results, from the filing database 20 (FIG. 16, ⑦; FIG. 17B, S93). The file name is displayed on the document window 18A (FIG. 16, ⑧).

According to the fifth embodiment, it becomes possible to register abstract data that are obtained by compressing the extracted text data from the files as the full-text searching data. Consequently, system efficiencies can be highly improved.

These embodiments of the electronic data filing system can be realized by packaged software stored in storage media, such as a memory card, a disk storage, IC memory (RAM, ROM, EEPROM), etc., that can be readable by a CPU in a personal computer system.

As explained above, the electronic data filing system and methods thereof utilize the full-text searching function to eliminate a previous keyword input operation for registering a file and for efficiently performing a searching operation of a particular file. Consequently, system efficiencies are highly improved by using the full-text searching data that are extracted from the text data of the file.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electronic data filing system, comprising:

a display means;

means for displaying on said display means a list of a plurality of files produced by at least one application program other than ones in the system;

means for designating particular files among said listed plurality of files for registering;

means for extracting full-text data from said designated particular files;

means for registering said full-text data as full-text searching data; and means for searching said full-text searching data based on one or more designated keywords.

2. The electronic data filing system according to claim 1, further comprising:

means for generating abstract data from said extracted full-text data; and means for registering said abstract data as said full-text searching data.

3. The electronic data filing system according to claim 2, wherein:

said abstract data are generated by weighting a group of keywords with a predetermined value.

4. The electronic data filing system according to claim 2, wherein:

said abstract data are generated by extracting a predetermined number of character strings.

5. The electronic data filing system according to claim 2, wherein:

said text extracting means includes a character recognizing function for converting image data to character data in order to generate said full-text searching data.

6. An electronic data filing system, comprising:

a display means;

means for displaying on said display means a list of a plurality of files which have previously been registered in said system;

means for designating particular files among said listed plurality of files for registering;

means for extracting full-text data from said designated particular files;

means for registering said full-text data as full-text searching data; and means for searching said full-text searching data based on one or more designated keywords.

7. The electronic data filing system according to claim 6, further comprising:
   means for generating abstract data from said extracted full-text data; and
   means for registering said abstract data as said full-text searching data.

8. The electronic data filing system according to claim 7, wherein:
   said abstract data are generated by weighting a group of keywords in a high frequency order.

9. The electronic data filing system according to claim 7, wherein:
   said abstract data are generated by extracting a predetermined number of character strings.

10. A method for filing electronic data, comprising the steps of:
    displaying a list of a plurality of files produced by at least one application program other than programs in the system;
    designating particular files among said listed plurality of files for registering;
    extracting full-text data from said designated particular files;
    registering said full-text data as full-text searching data; and
    searching said full-text searching data based on one or more designated keywords.

11. The method for filing electronic data according to claim 10, further comprising the steps of:
    generating abstract data from said extracted full-text data; and
    registering said abstract data as said full-text searching data.

12. The method for filing electronic data according to claim 11, wherein:
    said generating step includes generating said abstract data by weighting a group of keywords with a predetermined value.

13. The method for filing electronic data according to claim 11, wherein:
    said generating step includes generating said abstract data by extracting a predetermined number of character strings.

14. The method for filing electronic data according to claim 11, wherein:
    said text extracting step includes a character recognizing function for converting image data to character data in order to generate said full-text searching data.

15. A method for filing electronic data, comprising the steps of:
    displaying a list of a plurality of files which have previously been registered in an electronic data filing system;
    designating particular files among said listed plurality of files for registering;
    extracting full-text data from said designated particular files;
    registering said full-text data as full-text searching data; and
    searching said full-text searching data based on one or more designated keywords.

16. The method for filing electronic data according to claim 15, further comprising the steps of:
    generating abstract data from said extracted full-text data;
    registering said abstract data as said full-text searching data.

17. The method for filing electronic data according to claim 16, wherein:
    said generating step includes generating said abstract data by weighting a group of keywords in a high frequency order.

18. The method for filing electronic data according to claim 16, wherein:
    said generating step includes generating said abstract data by extracting a predetermined number of character strings.

* * * * *